United States Patent [19]
Morris et al.

[11] 3,923,617
[45] Dec. 2, 1975

[54] ELECTROLYTIC RECOVERY OF ZINC

[75] Inventors: Thomas M. Morris, Tucson; Edward A. Bilson, Inspiration, both of Ariz.

[73] Assignee: Inspiration Consolidated Copper Company, Morristown, N.J.

[22] Filed: Aug. 15, 1974

[21] Appl. No.: 497,669

[52] U.S. Cl. .................. 204/119; 75/109; 423/145
[51] Int. Cl.² .......................................... C25C 1/16
[58] Field of Search ........ 204/119; 423/145; 75/109

[56] References Cited
UNITED STATES PATENTS

| | | | |
|---|---|---|---|
| 3,271,279 | 9/1966 | Poor .................................... | 204/108 |
| 3,477,927 | 11/1969 | Veltman et al. ...................... | 204/119 |

*Primary Examiner*—R. L. Andrews
*Attorney, Agent, or Firm*—Pennie & Edmonds

[57] ABSTRACT

Iron-bearing zinc sulfide concentrates are leached with a sulfuric acid solution containing hexavalent chromium ions, e.g. chromic acid or a dichromate. The leach solution after separation from undissolved residue is hydrolyzed by heating under pressure at a temperature near or above the boiling point of the solution (ordinarily a range of from about 90° C. to about 250° C.) to precipitate iron as a basic ferric salt. The iron precipitate is separated, the residual solution subjected to zinc dust purification, and the thus purified solution then subjected to a first bifluid electrolysis to electrowon zinc and to regenerate sulfuric acid and reoxidize trivalent chromium ions to hexavalent form. Anolyte discharged from the first electrolysis is subjected as anolyte in a second bifluid electrolysis to oxidize remaining trivalent chromium to hexavalent form, and thereafter the solution is recycled to the leaching operation.

15 Claims, 2 Drawing Figures

ELECTROLYTIC RECOVERY OF ZINC

NATURE OF THE INVENTION

This invention relates to the recovery of zinc from ironbearing zinc material, especially sulfidic material such as zinc sulfide concentrates. In accordance with the invention, such material is leached with a sulfuric acid solution containing hexavalent chromium ions, as a result of which zinc is brought into solution as zinc sulfate and the chromium compound is reduced to a trivalent state. Iron present in the starting material is also dissolved as a ferric compounds. The dissolved iron is precipitated by hydrolyzing the solution under pressure at a temperature at about or above the boiling point of the solution, and after separating such precipitate the solution is subjected to zinc dust purification. Zinc is electrowon from the residual solution and the trivalent chromium is reoxidized to the hexavalent state in a bifluid electrolytic operation.

BACKGROUND OF THE INVENTION

Many proposals have heretofore been made for recovering zinc by leaching from zinc-bearing raw materials, such as naturally occurring zinc ores, zinc concentrates prepared from sulfidic ores, zinc scrap, etc. A few such materials, such as zinc ores in which the zinc is present as a carbonate or a silicate, and zinc scrap, are readily treated by leaching with dilute sulfuric acid. However, most such zinc materials treated industrially for zinc recovery contain zinc in the form of a sulfide, and such materials are substantially insoluble in water or dilute sulfuric acid. Various leaching procedures for the recovery of zinc from such materials have been proposed but have not proved economically satisfactory for the treatment of predominately sulfidic zinc ores and concentrates.

BRIEF DESCRIPTION OF INVENTION

In accordance with the invention, zinc is recovered from iron-bearing zinc raw material by a cyclical leaching and electrowinning process. The raw material may be a sulfidic zinc ore or concentrate, or other material in which the zinc is present in sulfide such as a smelter residue or mill tailing.

The zinc material is first leached with an aqueous sulfuric acid solution containing ions of hexavalent chromium, such as are provided by chromic acid or a dichromate. The chromic acid leach will dissolve all sulfide minerals with the exception of $MoS_2$ and $FeS_2$. PbS is dissolved and reprecipitated as $PbSO_4$. This leach also dissolves metals at a rate directly proportional to the surface area of the metal. After dissolution of a substantial portion of the zinc, the leach solution, depleted in acid to a pH above 0.6 and containing dissolved zinc, trivalent iron, and trivalent chromium ions, is separated from the undissolved residue. The separated leach solution then is heated at superatmospheric pressure and at a temperature near or above the boiling point of the solution to hydrolyze the iron and cause it to precipitate in the form of a basic ferric salt. This precipitate is separated from the residual solution and the solution subjected to zinc dust purification. The solution is then subjected to a first bifluid electrolysis to electrowin metallic zinc from the catholyte, and to regenerate sulfuric acid and partially reoxidize trivalent ions to hexavalent chromium ions in the anolyte. The anolyte from this first bifluid electrolysis then is subjected as anolyte to a second befluid electrolysis to oxidize substantially all remaining trivalent chromium ions to hexavalent form, and the anolyte discharged from this second bifluid electrolysis is recycled to the leaching operation for treatment of a further quantity of the zinc material.

The leaching reagent employed in the process generally contains from 20 to 280 g/l sulfuric acid and 10 to 80 g/l of chromium, substantially all of which is in the hexavalent form, plus recycled amounts of dissolved zinc and iron compounds. A suitable leaching reagent will contain from 20 to 200 g/l of sulfuric acid, 15 to 60 g/l chromium, 15 to 70 g/l of recycled zinc, and up to 5 g/l of recycled iron; preferably 80 g/l acid, 40 g/l chromium, 50 g/l zinc, and 0.5 g/l iron (the total chromium will comprise 25 g/l hexavalent chromium and 15 g/l trivalent chromium).

The leach solution withdrawn from the leaching operation will be substantially enriched in zinc, and will also be enriched in iron, but will largely be depleted in acid. Typically, the leach solution will contain about 10 g/l acid, about 70 g/l zinc, about 5 g/l iron in the trivalent state, about 40 g/l chromium mainly in the trivalent state (39 g/l), and will have a pH not less than about 0.6, say between 0.6 and 3.

Hydrolysis of the iron takes place readily and does not require unusually high pressures. In general, hydrolysis is advantageously carried out at a temperature in the range from about 90°C. to 250°C. at equilibrium pressure. Several basic ferric compounds are stable in sulfuric acid solutions at elevated temperatures, and more than one of them may be present in the bacic precipitate that forms at temperatures above 130°C. and at a pH from 0.6 to 3. The precipitate can be $3Fe_2O_3$, $4SO_3.9H_2O$, but it may include compounds having a different proportion of $SO_3$ to $Fe_2O_3$ and for that reason is herein called a "sulfate salt" rather than simply a "sulfate", natrojarosite or jarosite as hereinafter described. The precipitation of such compounds from sulfuric acid solutions containing a dissolved metal is described by T. R. Scott in "Unit Processes in Hydrometallurgy", pages 169 to 182, published in 1964 by the American Institute of Mining, Metallurgical and Petroleum Engineers.

The residual solution from which the basic ferric salt precipitate has been separated is subjected to a zinc dust purification to remove impurities which would be harmful to the electrolysis step. These impurities would either deposit with the zinc cathode or reduce the current efficiency of the deposition of the zinc.

In the first bifluid electrolysis, the residual solution from which the impurities have been separated flows substantially continuously and sequentially first as catholyte in contact with the cathode and then as anolyte in contact with the anode through a bifluid electrolytic cell wherein the anolyte and catholyte are separated by a permeable diaphragm. The cathodes on which zinc is electrolytically deposited are periodically withdrawn from the catholyte and are replaced by new zinc starting sheet cathodes. The zinc produced in this fashion is of electrolytic grade and can be marketed as cathodes or can be melted and cast into standard zinc shapes.

The anolyte from the first bifluid electrolysis flows continuously as anolyte in contact with the anode through the second bifluid electrolysis, and thence is recycled to the leaching operation. The catholyte in this operation is simply an aqueous sulfuric acid solution containing say 50 to 250 g/l sulfuric acid, which seeps through the diaphragm into the catholyte. Make-up sulfuric acid solution is added to catholyte as required to replenish such seepage.

When, in the leaching of sulfidic materials, there is a build-up in the sulfate concentration of the leach solution, some or all of the anolyte from the second bifluid operation may be treated to remove sulfate (and other impurities) therefrom prior to recycling to the leaching operation. Sulfate removal may be accomplished by treating the anolyte with calcium carbonate and filtering the resulting gypsum precipitate from the solution.

The residue from the leaching operation generally will contain some undissolved zinc and perhaps other values. This residue may be releached with additional sulfuric acid containing hexavalent chromium ions, and the releach solution may then be recycled to the main leaching operation. Alternatively, if the raw material is a zinc sulfide, the solid leached residue may be subjected to a flotation operation to recover a zinc concentrate, which may be then treated in the leaching operation.

While the use of a sulfuric acid and hexavalent chromium leach as described above has been utilized with copper processing (U.S. Pat. No. 3,730,860), it is surprising to find it successful in treating zinc materials which are treated quite differently from copper.

DESCRIPTION OF THE DRAWING

The invention is described below in greater detail with specific reference to the accompanying drawing, the single FIGURE of which is a flow sheet of a preferred embodiment according to the invention, showing enclosed in dashed lines certain optional procedures which may be incorporated in the process.

DESCRIPTION OF A SPECIFIC EMBODIMENT OF THE PROCESS

Figure 1A:
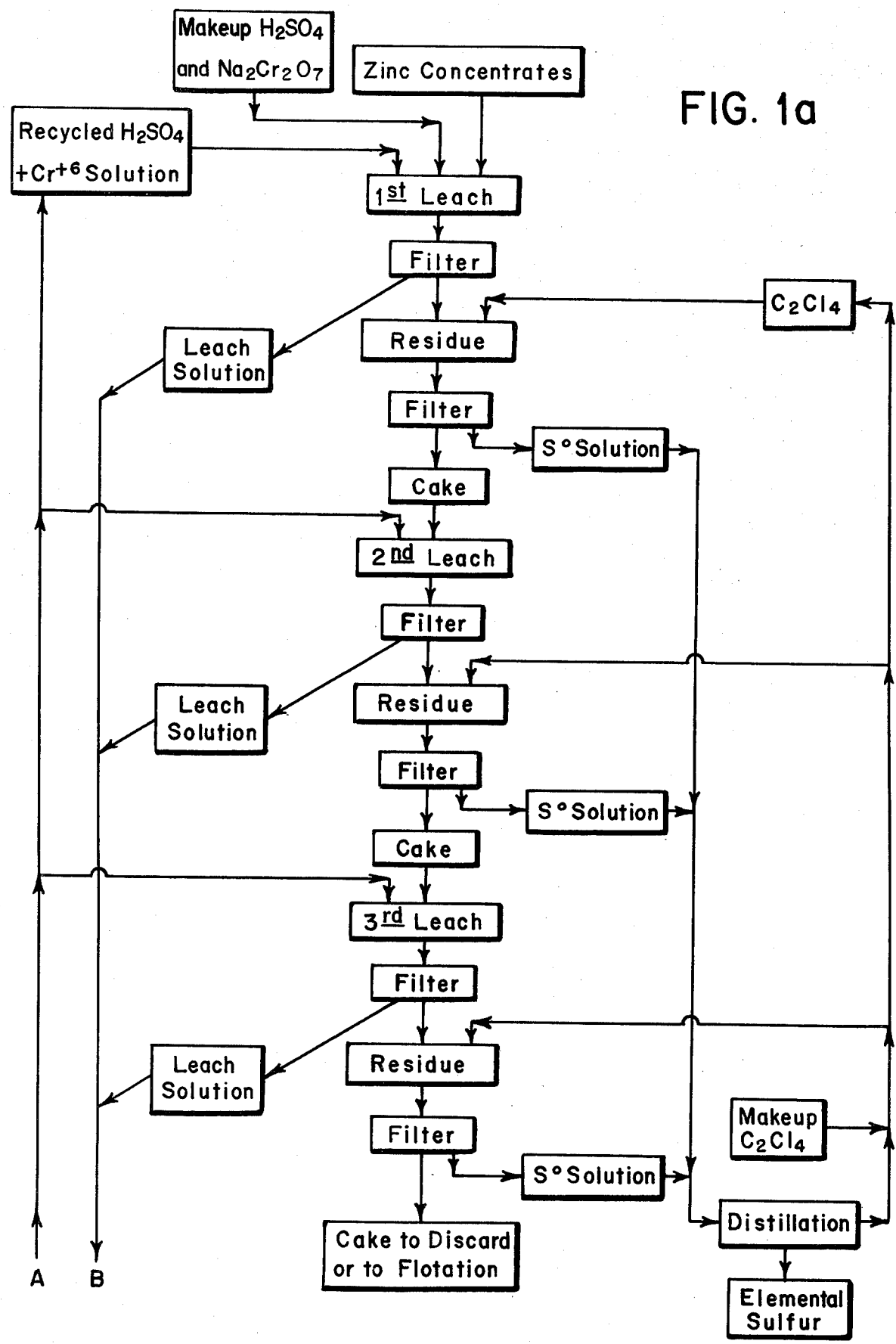
Figure 1B:
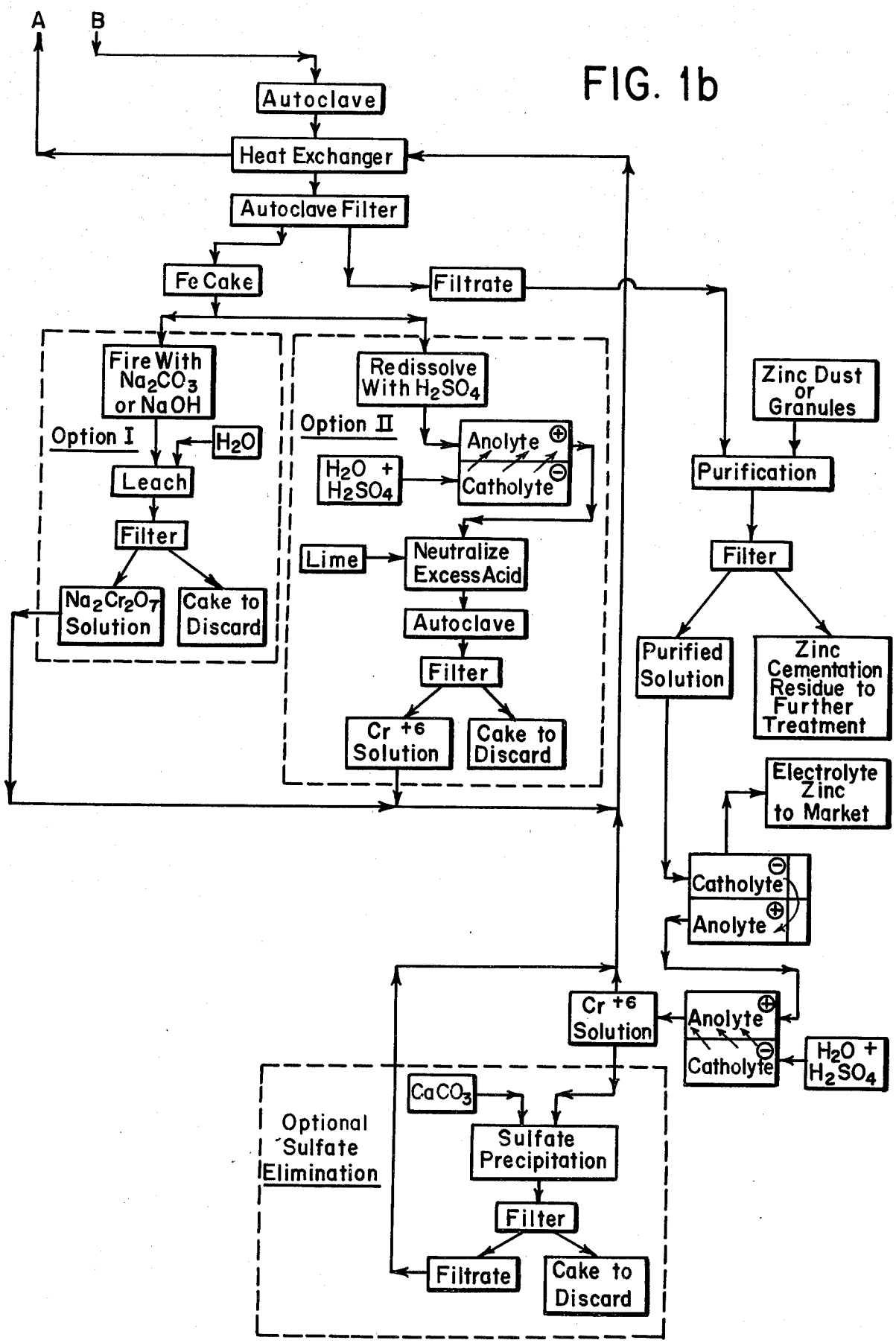

The exemplary embodiment of the invention described below with reference to the accompanying flow sheet is for the treatment of a conventional zinc sulfide concentrate. Typically, such concentrate also will contain some siliceous material, minor quantities of other values such as copper, lead, gold, silver, etc.

The zinc concentrates are in finely-divided form, and are subjected to a leaching operation with aqueous sulfuric acid solution in which a compound of hexavalent chromium is dissolved. An agitated leach is preferred, in order to assure effective intermixing of the finely-divided concentrates with the leach reagent. Leaching may be conducted as a batch-type operation, or it may be carried out as a co-current operation in a series of leaching tanks. Any conventional leaching procedure may be used with success.

While in the process set forth in the flow sheet, a series of three leaches is depicted, a single leaching step can be used if active agitation is utilized so as to enable the sulfur to be removed from the zinc particles. While not completely understood, it is believed that vigorous agitation prevents sulfur from coating the zinc particles and permits the acid and chromium to leach most fully. Any of the usual organic solvents for elemental sulfur may be used during the leach to dissolve the elemental sulfur formed by the leach.

The leaching solution essentially is aqueous sulfuric acid containing from 75 to 280 g/l $H_2SO_4$, in which the compound of hexavalent chromium is dissolved to a concentration which may be in the range from 10 to 80 g/l total chromium. The acid concentration in the leach solution is selected on the basis of the composition of the concentrates, and must be high enough to ensure dissolution of the zinc and to satisfy other acid consumers present, such as the iron. It should also be sufficiently high to ensure that the leach solution at the conclusion of the leaching operation is distinctly acid, but not too acid to hamper the subsequent hydrolysis operation. Advantageously, the acid concentration of the leaching reagent fed into the leaching operation is in the range from 25 to 200 g/l. A typical leaching reagent will contain about 80 g/l $H_2SO_4$.

The chromium compound may be any compound of hexavalent chromium soluble in the aqueous acid leach medium. The reagents most readily available are chromic acid and other soluble chromates such as magnesium chromate, and dichromates such as sodium dichromate. Either may be used successfully or they may be used jointly. The amount of chromium compound present must provide sufficient hexavalent chromium to oxidize the sulfide component of the zinc sulfide to elemental sulfur, and to satisfy the needs of unavoidable side reactions such as oxidation of ferrous iron to ferric and of sulfide sulfur to sulfate. Some excess of hexavalent chromium over these needs is desirable, but the excess need not be great. A typical leaching reagent contains 15 to 60 g/l total chromium, mostly in the hexavalent form, say about 40 g/l.

The leaching reagent is for the most part a regenerated solution recovered from the treatment of the off-solution from a previous leaching operation, and it, therefore, contains substantial quantities of recycled zinc and a small amount of recycled iron. The zinc content in the recycled leaching reagent conventionally is in the range from 15 to 40 g/l zinc present as dissolved zinc sulfate. Some dissolved iron, mainly in the form of ferric sulfate, also is usually present in a concentration up to 5 g/l. All iron in solution will be in the ferric form as long as excess hexavalent chromium is present.

Recycled solution, of course, constitutes the bulk of leaching reagent delivered to the leaching operation, but it may be supplemented by dichromate solution recovered from treatment of the iron precipitate and by zinc-bearing releach solution recovered from the treatment of leach residue in a secondary leaching operation. Additionally, any necessary make-up amounts of sulfuric acid and hexavalent chromium are supplied to these reagents.

The duration of the leaching operation depends on the ease of treatment of the concentrates or other material being leached. Leaching for as little as five or ten minutes for each leach will, in some cases, suffice to extract a large amount of the zinc from the concentrates; but usually the leaching time will be longer — up to one-half hour, usually, for each leach. Zinc dissolves very rapidly from fresh concentrates during the early part of the leaching operation, and then more slowly as time of leaching increases. This may be due to deposition of a film of elemental sulfur, as noted above, formed as a product of the leach reaction, on the zinc-bearing mineral particles. Normally, the leaching operation will be continued only so long as is necessary to obtain an acceptably high recovery of the soluble metal values from the raw material, and this usually is accomplished in ten to thirty minutes. If a single leaching step is used with an organic in leach, 99% or more of zinc can be recovered after a leach of about one hour.

Leaching normally is conducted at a somewhat elevated temperature, say 50° to 95°C., but a higher or lower temperature may be used if desired. The leaching operation is exothermic and will maintain the temperature of a normal leaching operation at up to 50°C. For higher temperatures heat must usually be supplied from an outside source. In the process of the flowsheet a typical leaching temperature is in the range from 70° to 95°C. Neither time of leaching nor temperature is critical. Each is selected in the particular case depending on leaching characteristics of the concentrates, the availability of heat for the leaching operation, and the desired recovery of zinc.

During leaching much of the sulfur present in the concentrates is oxidized to elemental form, but some is oxidized further to sulfate. It is, of course, desirable to minimize the amount of sulfate sulfur formed, both to avoid consumption of hexavalent chromium and to avoid accumulation of sulfates in the leach solution. Sulfate formation is promoted by the presence of a high concentration of hexavalent chromium during the progress of the leaching operation. Accordingly, it is desirable to feed leaching reagent into the leaching operation as it is consumed by the concentrates, so that at no time during leaching is there any very substantial excess of hexavalent chromium. By metering the rate of addition of leaching reagent to the leaching operation so that the concentration of hexavalent chromium actually present at any moment is less than about 5 g/l, the amount of sulfur oxidized to sulfate form can be kept within reasonable bounds. Alternately, the zinc concentrate can be added to the leach solution containing excess hexavalent chromium. This permits the reaction to be completed with about one hour with vigorous agitation and results in 99% recovery of zinc.

The elemental sulfur and undissolved solids are removed from the leach solution by filtration. The filter cake is mixed $C_2Cl_4$ solvent to dissolve the elemental sulfur. The sulfur solution is separated from the undissolved solids by filtration and is distilled to separate the $C_2Cl_4$ which is recycled and the the elemental sulfur. The dissolved iron in the leach filtrate is removed by hydrolysis and the excss hexavalent chromium reduced by means of scrap metal.

Following are illustrative reactions which take place during leaching:

$3ZnS + Na_2Cr_2O_7 + 7H_2SO_4 \rightarrow 3ZnSO_4 = 3S° + Na_2SO_4 + 7H_2O + Cr_2(SO_4)_3$
$2FeS + Na_2Cr_2O_7 + 7H_2SO_4 \rightarrow Fe_2(SO_4)_3 + 2S° + Na_2SO_4 + 7H_2O + Cr_2(SO_4)_3$ At the conclusion of the leaching operation, insoluble residue of the leached concentrates is separated from the leach solution. This may be accomplished by decantation, or it may be accomplished by filtration. If decantation is employed, it is preferably a countercurrent operation in a series of thickeners. Filtration, however, is preferred because a quick and more through separation of solution from leach residue may thereby be achieved.

The insoluble leach residue (filter cake) is either discarded or treated to recover values contained therein. The separated leach solution is treated for recovery of its zinc content and to regenerate the leaching reagent. Total chromium is substantially the same as in the initial leaching reagent, but it is present primarily in the trivalent form. The leach solution is depleted in acid but is still distinctly acidic, having a pH above 0.6, say in the range from 0.6 to 3, and preferably about 1.5.

The first step in the treatment of the leach solution is to precipitate the dissolved iron. This is accomplished by hydrolyzing the leach solution at a temperature at about or above the boiling point of the solution and at superatmospheric pressure to precipitate a basic ferric salt. Hydrolysis proceeds readily at temperatures in the range from about 90°C. to 250°C., at equilibrium pressure, even when the pH of the solution is not substantially above about 1.0. If the temperature used is above the boiling point, the hydrolysis operation is carried out in an autoclave. Since the pressure generally will not exceed about 700 pounds per square inch even at 250°C., the autoclave presents no major design problem. Preferably, hydrolysis is carried out at the temperature from 150° to 200°C., at equilibrium pressure in the range from 50 to 700 pounds per square inch. An advantageous autoclaving temperature is in the range from 170° to 180°C. Heating of the leach solution in the autoclave is advantageously accomplished by a direct injection of steam into the solution in the autoclave.

If $MgCrO_4$ or $CrO_3$ is used in the original leach, the iron removal step will probably produce basic ferric sulfate. Ferric (but not ferrous) sulfate solutions hydrolyze readily at high temperatures. The stable basic ferric oxides at high temperatures, in addition to $Fe_2O_3$, are hydrated complexes of $Fe_2O_3$ and $SO_3$. In strongly acid solutions (pH 0.6 to 3) at temperatures above 130°C. the predominant stable basic ferric salt has the composition $3Fe_2O_3 \cdot 4SO_3 \cdot 9H_2O$, but other stable complexes such as $Fe_2O_3 \cdot 3SO_3$ and $Fe_2O_3 \cdot 2SO_3H_2O$ may also form. The basic sulfate salt complex forms readily and rapidly when an acid solution containing ferric sulfate is sufficiently heated, but the completeness with which dissolved iron is converted to this insoluble material depends on the acidity of the solution. At a pH near 1.0, complete precipitation of the iron is not achieved, but the iron content of the solution is readily reduced from near 25 g/l to less than 3 g/l, and such an iron content in the recycled solution is not objectionable. If sodium or potassium are present in the solution fed to the autoclave, natrojarosite or jarosite will be formed. If aluminum is present with sodium or potassium, it will be removed as alunite.

Autoclaving requires only a short period of time. Substantially all the iron which will precipitate at the chosen autoclave temperature forms within ten minutes to half an hour, and so autoclaving is preferably terminated within this time period. However, autoclaving for a longer time (up to an hour or more) is not objectionable except for the extra cost involved.

After autoclaving the solution for the indicated period of time, the autoclave pressure is reduced to atmospheric. This can be done either by venting steam from the autoclave and then emptying it of the slurry of solution and precipitate, or by blowing such slurry out through a blow-down valve while the autoclave contents are still under pressure.

The discharge from the autoclave is passed through a heat exchanger to a filter, where the basic ferric salt precipitate is separated from the residual solution. The heat exchanger is utilized to preheat recycled leached solution en route to the leaching operation. Such preheating of the leach solution promotes the leaching operation by having it proceed at an elevated temperature, and it conserves heat in the autoclaving operation by providing heated leach solution for treatment in the autoclave.

The filtrate separated from the iron precipitate is treated for zinc recovery. The iron precipitate itself carries with it an appreciable quantity of chromium, probably in the form of chromite, and advantageously the precipitate is treated to recover it. Such treatment, indicated as Option I in the drawing, preferably involves mixing the iron cake from the autoclave filter with a suitable alkaline material, and firing in an oxidizing atmosphere. Sodium carbonate or sodium hydroxide are preferred alkaline materials although the corresponding compounds of other alkali metals may be used. Also, such alkaline materials as lime may be used in whole or in part in forming the mixture with the iron cake.

Firing may take place in a reverberatory furnace or a rotary kiln. In either case, air passes freely over or through the mixture during firing to provide oxygen for oxidation of the trivalent chromium in the iron cake to hexavalent form. The charge during firing is heated to a temperature in excess of 1250°F. and preferably 1400°F. or somewhat higher.

The fired charge is withdrawn from the furnace, and after cooling is leached with water. The chromium, now in the form of a water-soluble chromate, is readily extracted, and is recycled for reuse in leaching additional zinc concentrates. The iron oxide residue of the leaching operation is discarded.

An alternate procedure (indicated as Option II in the drawing) comprises redissolving the iron precipitate with sulfuric acid and passing the solution through an electrolytic operation in a diaphragm cell having separated anolyte and catholyte compartments. As depicted, additional water and sulfuric acid are added to the catholyte compartment and the solution leaving the cell is neutralized with lime, autoclaved as noted above, filtered, and the hexavalent chromium recycled for reuse in the leaching operation. The remaining iron cake is discarded.

The filtrate from the primary iron precipitation is subjected to electrolysis in the catholyte compartment of a bifluid electrolytic cell, where its zinc content is electrowon after first being subject to purification. The major impurity present is copper with nickel, cobalt, lead, cadmium, antimony and arsenic also present in some cases. Purification is accomplished using zinc dust or granules; preferably granules of about 10 mesh and is performed in two stages. The thus purified solution is fed to a first bifluid electrolytic operation which is carried out in a diaphragm cell having anolyte and catholyte compartments separated by a permeable ceramic or fabric diaphragm and having an overflow chamber at one end of the cell through which catholyte discharged from the catholyte compartment is directed into the anolyte compartment. The solution thus flows sequentially first through the catholyte compartment of the cell and then through the anolyte compartment, from which it is discharged. The catholyte is under a slight hydrostatic head with respect to the anolyte, to prevent hexavalent chromium from coming in contact with the cathode deposit.

The cathode reactions which take place in the catholyte compartment involve mainly the deposition of metallic zinc on the cathodes. The cathodes may be conventional zinc or stainless steel starting sheets hung in closely spaced arrangement in the catholyte compartment. When a sufficient weight of zinc has deposited on them, they are withdrawn from the cell and are replaced with new starting sheet cathodes. The zinc cathode product is of electrolytic quality and is marketable as such or it may be melted and cast into standard zinc shapes such as billets, cakes and slabs.

In the anolyte compartment, anodes, preferably of lead or lead alloy, are arranged in closely spaced relation in contact with the anolyte flowing through the cell. In the anolyte, the principal reaction involves reoxidation of trivalent chromium to hexavalent form. This bifluid operation is conducted at a low enough cell voltage, say about 3.0, so that there is little tendency for any hydrogen polarization to occur at the cathode. As a result, only an amount of hexavalent chromium is regenerated at the anode corresponding to the amount of zinc deposited at the cathode.

The outflow from the first anolyte compartment of the first electrolytic operation is only partially regenerated, for hexavalent chromium converted to trivalent form by oxidation of iron and sulfur during the leaching operation remains to be reoxidized. Accordingly, the anolyte from the first bifluid electrolysis is flowed as anolyte through the anolyte compartment of a second bifluid electrolytic cell. This cell also is one in which the anolyte and catholyte compartments are separated by a permeable diaphragm, but here the incoming solution flows only through the anolyte compartment and thence out of the cell. In the anolyte compartment, lead anodes are disposed similarly to the arrangement in the first bifluid cell, and in the catholyte compartment of this second bifluid cell, cathodes are arranged similarly to the cathodes in the first bifluid cell. The catholyte here is merely aqueous sulfuric acid solution containing sufficient acid to permit the flow of current between anode and cathod with low electrical resistance.

In the second bifluid electrolytic operation, substantially all remaining trivalent chromium is reoxidized to hexavalent form, so that the outflow from this cell is substantially fully regenerated with respect to its hexavalent chromium content. At the cathode, hydrogen is liberated and is vented to the atmosphere (unless it is considered desirable to collect it as a product of the process). The reaction requires a cell voltage of about 3.0. The catholyte is maintained at a slight hydrostatic head with respect to the anolyte in the second bifluid cell, so that some catholyte steadily steeps into the analyte in order to avoid contamination of catholyte with chromium or zinc. Make-up aqueous sulfuric acid is added to the catholyte compartment as required to compenstate for such seepage.

In both bifluid electrolytic operations, acid regeneration occurs in the anolyte. Thus, the anolyte solution flowing from the anolyte compartment of the second bifluid cell is substantially fully regenerated with respect to both sulfuric acid and hexavalent chromium ions, and is ready for recycling to the leaching operation. The amount of sulfuric acid shown by the foregoing cell reaction to be regenerated is somewhat less than the amount of acid consumed (ideally) in the leaching operation. The difference, however, is made up by acid formed during the hydrolytic precipitation of iron in the autoclaving treatment; and hence it is correct to state that the anolyte outflow from the second electrolytic cell is substantially fully regenerated in acid and in hexavalent chromium.

Since it is neither desirable nor practical to precipitate more than about half the zinc content from the electrolyte in the first bifluid electrolysis, the anolyte recycled to the leaching operation from the second bifluid electrolysis will contain substantial zinc. It will also contain such dissolved iron as was not removed during autoclaving (say up to 3 g/l). Recycling of such amounts of zinc and iron are not burdensome on the process, however.

It is generally advantageous to treat all or a portion of the anolyte outflow from the second electrolytic operation to eliminate excess sulfate formed during leaching. This is conveniently done by treating a bleed from the outflow solution with lime or limerock to precipitate gypsum (calcium sulfate). Such precipitate is filtered or otherwise separated from the solution, and the resulting solution with its reduced sulfate concentration is recycled to the leaching operation.

As noted above, the insoluble residue from the leaching operation may contain values which it is desirable to recover. Various alternative procedures may be used for the treatment of such residues.

This residue generally contains elemental sulfur formed as a result of the reactions which take place during leaching. The residue may be heated to vaporize this sulfur, which then may be recovered by condensation. Alternative methods of separating the sulfur from the leached residue are also available and may be used if desired. The major value present in the leach residue remaining after desulfurization will be undissolved zinc, which is present in its original form as a sulfide mineral. Hence one method for treating the desulfurized residue is to subject it to a froth flotation operation to prepare a concentrate of the undissolved zinc sulfides present. When this method is employed, the concentrate from such flotation operation may be introduced into the leaching operation for retreatment, and the flotation tailings may be either discarded or treated for recovery of lead, gold, silver, or such other values as may be contained therein.

Instead of flotation, a releaching operation may be employed to recover the undissolved zinc from the desulfurized leach residue. In such case, the residue is repulped with regenerated leaching reagent, or with make-up leach reagent. Thereafter, the releach solution is filtered or otherwise separated from the residual insoluble residue and is recycled to the primary leaching operation. As in the case of flotation treatment, the residue from the releaching operation may be discarded or may be treated for any values it contains.

To further illustrate the invention, reference is made to the following specific examples of the practice of the process.

400 parts by weight of a zinc sulfide concentrate was leached with a solution of zinc sulfate, sodium chromate, and sulfuric acid having the following analysis;

| Zn | 80.3 g/l |
| Cr | 25.45 g/l |
| $H_2SO_4$ | 100.0 g/l |

The concentrate contained 46.1% Zn, 14.2% Fe., 32.1% S, 0.51% Cu, 0.14% Pb, and 1.46% insolubles.

The leach of the concentrate was carried out in three stages, each of which comprised the following procedure:

1. the concentrate was added to water which amounted to 10% of the leach solution to be added;
2. the slurried concentrate was heated to 80°C.;
3. the leach solution was heated to 80°C.;
4. the leach solution was added to the slurry at a constant rate for 20 minutes;
5. the slurry was allowed to react for an additional 10 minutes, and the temperature was maintained near the boiling point of the solution during the entire leach (88°–92°C.);
6. the slurry was filtered while hot;
7. the volume of the filtrate was measured and a sample taken and the filtrate became the feed for the autoclave step;
8. the filter cake was air dried;
9. the dried cake was mixed with carbon disulfide to remove the elemental sulfur and the slurry was filtered and washed with additional carbon disulfide; and
10. the cake was air dried and became the feed for the next leach stage.

At the end of the third leach, 95.1% of the Zn had been extracted and 74% of the sulfide sulfur that dissolved was recovered as elemental sulfur.

The leach filtrate having a pH of about 1.0 to 1.5 was placed in an autoclave and heated to a temperature of 200°C. for 30 minutes. The solution was then cooled to below 90°C. and filtered. The solid containing the iron was not processed although it could be further treated as shown in the drawing to recover hexavalent chromium.

The filtrate from the autoclave filter contained 92.4 g/l Zn, 20.8 g/l Cr, 35.0 g/l $H_2SO_4$, 0.35 g/l Fe, and 0.17 g/l Cu. This filtrate was then purified with elemental zinc granules (10 mesh) performed in two stages.

The purified filtrate was then passed through electrolytic cells having anolyte and catholyte compartments, as described above, to recover the zinc. A stainless steel starting sheet, cleaned with nitric acid, was used as the cathode and the cathode current efficiency was 79% using a current density of 40 amps per square foot.

While the invention has been described in connection with a preferred embodiment, it is not intended to limit the invention to the particular form set forth, but, on the contrary, it is intended to cover such alternatives, modifications and equivalents as may be included within the spirit and scope of the invention as defined by the appended claims.

What is claimed is:

1. The method of recovering zinc from iron-bearing zinc sulfide concentrates which comprises the steps of:
   a. leaching the concentrates with an aqueous sulfuric acid solution containing hexavalent chromium ions;
   b. separating the leach solution depleted in acid at a pH above 0.6 and containing zinc, trivalent iron and trivalent chromium ions from the undissolved residue,
   c. hydrolyzing the separated leach solution under pressure at a temperature near or above the boiling point of the solution to form a basic ferric sulfate salt precipitate,
   d. separating said precipitate from the residual solution,
   e. purifying the residual solution by treatment thereof with finely divided metallic zinc,
   f. subjecting the purified solution to a first bifluid electrolysis to deposit metallic zinc from the catholyte and to regenerate sulfuric acid and partially reoxidize trivalent chromium ions to hexavalent chromium ions in the anolyte,
   g. subjecting anolyte from said first bifluid electrolysis to a second bifluid electrolysis to oxidize substantially all remaining trivalent chromium ions to hexavalent chromium ions in the anolyte, h. and recycling anolyte from said second bifluid electrolysis to leach a further quantity of said zinc sulfide concentrates.

2. The method according to claim 1 wherein the zinc sulfide concentrates are leached with a solution comprising recycled anolyte from the second bifluid electrolysis plus make up amounts of sulfuric acid and a hexavalent chromium compound and containing 20 to 280 g/l sulfuric acid and 10 to 80 g/l chromium plus recycled amounts of dissolved zinc and iron compounds.

3. The method according to claim 2 wherein the solution contains 25 to 200 g/l sulfuric acid, 15 to 60 g/l chromium, 35 to 100 g/l zinc and up to 5 g/l iron.

4. The method according to claim 1 wherein the purified solution from the treatment with metallic zinc flows substantially continuously and sequentially as catholyte in contact with the cathode and then as anolyte in contact with the anode in the conduct of the first bifluid electrolysis.

5. The method according to claim 4 wherein cathodes bearing electrolytically deposited zinc are periodically withdrawn from the catholyte, the zinc is stripped therefrom, and the cathodes are introduced into the catholyte.

6. The method according to claim 1 wherein the sulfidic constituents of the zinc sulfide concentrates are in part oxidized to sulfate ions during leaching, and the anolyte from the second bifluid electrolysis is treated prior to recycling to the leaching operation to precipitate an insoluble sulfate therefrom, thereby to remove excess sulfate formed during leaching.

7. The method according to claim 6 wherein the anolyte is treated with calcium carbonate to precipitate calcium sulfate, such precipitate is separated from the residual anolyte solution, and said residual anolyte solution is recycled to the leaching operation.

8. The method according to claim 1 wherein the hydrolysis operation is conducted at a temperature of from about 90°C. to 250°C.

9. The method according to claim 1 wherein the leach solution withdrawn from the leaching operation contains 10 to 80 g/l chromium mainly in the trivalent state, 50 to 120 g/l zinc, 5 to 30 g/l iron mainly in the trivalent state, and has a pH not less than about 1.5.

10. The method according to claim 1 wherein the leach solution is slowly added to the zinc sulfide concentrates so that the concentration of hexavalent chromium in contact with such material is at all times maintained below about 5 g/l, thereby to limit oxidation of sulfide sulfur to sulfate.

11. The method according to claim 1 wherein the leach solution is hydrolyzed by heating at a temperature of from about 90°C. to 250°C. at equilibrium pressure for a time of at least 15 minutes and then while being maintained at equilibrium pressure is cooled to below 100°C.

12. The method according to claim 1 wherein the basic ferric sulfate salt precipitate containing trivalent chromium is redissolved in a sulfuric acid solution, the resulting solution is passed as anolyte through a bifluid electrolytic cell, whereby trivalent chromium is oxidized to hexavalent form, the oxidized acid solution is at least partially neutralized and is then again hydrolyzed to precipitate iron as a basic ferric sulfate salt, and the residual solution containing depleted in iron and contain hexavalent chromium is recycled to the leaching operation.

13. The method according to claim 1 wherein the residual solution from the basis ferric sulfate salt precipitation, containing 20 to 50 g/l sulfuric acid is treated with granular metallic zinc in excess of the amount stoichiometrically required to displace from solution all heavy metals below zinc in the electromotive series which are dissolved therein, and the displaced heavy metals are then separated from the purified solution.

14. The method according to claim 1 wherein the purified solution is further purified by retreatment with a futher quantity of granular metallic zinc.

15. The method according to claim 1, wherein anolyte from the first bifluid electrolysis flows substantially continuously as anolyte in contact with the anode through the second bifluid electrolysis and thence is recycled to the leaching operation.

* * * * *